C. ROSINE.
COMBINED SHOE HORN AND BUTTON HOOK.
APPLICATION FILED NOV. 24, 1913.
1,130,198.
Patented Mar. 2, 1915.
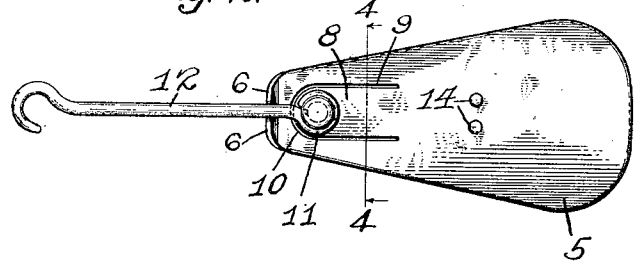
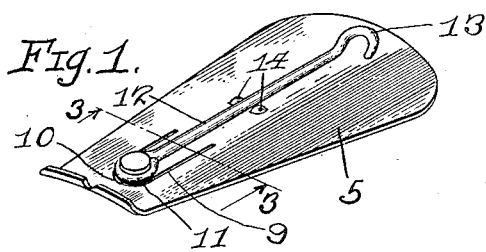
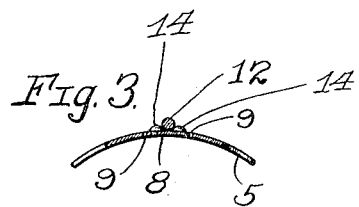
Witnesses:
L. B. Graham
Inventor:
Conrod Rosine
By Jones Addington Ames Siebred
Att'ys.

UNITED STATES PATENT OFFICE.

CONRAD ROSINE, OF CHICAGO, ILLINOIS.

COMBINED SHOE-HORN AND BUTTON-HOOK.

1,130,198.  Specification of Letters Patent.  Patented Mar. 2, 1915.

Application filed November 24, 1913. Serial No. 802,791.

*To all whom it may concern:*

Be it known that I, CONRAD ROSINE, a citizen of the United States, residing at Chicago, in the county of Cook and State of Illinois, have invented new and useful Improvements in Combined Shoe-Horns and Button-Hooks, of which the following is a full, clear, concise, and exact description, reference being had to the accompanying drawing, forming a part of this specification.

My invention relates to improvements in combined shoe horn and button hook and has for its object the production of a device that can be folded in convenient shape and carried in the pocket.

Another object is the production of a device in which the button hook is held spring-pressed against the horn when not in use and held rigidly in place when it is to be used as a hook.

A further object is the production of a device that can be cheaply manufactured and one that has no liability of getting out of order.

These and such other objects as may hereinafter appear are attained by my device, an embodiment of which is illustrated in the accompanying drawings, in which:

Figure 1 represents a plan view of the device closed; Fig. 2 represents a plan view of the device open; Fig. 3 represents a sectional view on the line 3—3 of Fig. 1 looking in the direction indicated by the arrows; Fig. 4 represents a sectional view on the line 4—4 of Fig. 1 looking in the direction indicated by the arrows.

Referring now to the drawings, the device comprises a shoe horn 5, preferably stamped from an integral piece of metal in curved form, as indicated in the drawings. The upper end of the horn is up-set as shown at 6, forming a shoulder having a centrally disposed notch or socket 7 adapted to receive the shank of the hook. A portion of the interior of the horn is partially cut out forming a spring member 8, a portion of the metal of the horn being cut away on either side of the member 8 as indicated at 9, the purpose of which will be explained later. A pin or support of some kind 10 is mounted near the end of the spring member 8 and about this is twisted the end 11 of the button-hook which comprises the end 11, a shank 12 and the hook 13.

When the device is in closed position, the spring member 8 is flush with the top of the adjacent metal of the horn, the button hook lying flat against the outer face of the horn. When the device is in use the hook is turned on the pivot 10 into the position indicated in Fig. 2, the shank of the hook passing over the shoulder 6 and dropping into the notch 7, thus assuring a rigid support for the hook, the horn forming a handle for the combined tool when it is used as a button hook, the button-hook forming a handle for the horn when it is desired to be used as a horn.

In order to have the spring member 8 effective, it is necessary to cut away a small portion of the metal of the horn so that the spring member can have free movement in and out when the hook member is turned outwardly into position as indicated in Fig. 2.

This device is extremely simple, but it can be cheaply manufactured, and is in compact form, so that it can be readily carried in the pocket and can be quickly opened into position for use.

The device is preferably made from pressed steel or something of this character and can be manufactured very cheaply and very expeditiously so that it can be sold at a very small figure and distributed to the trade through shoe dealers for practically nothing for the cheaper varieties, and plated with either nickel, silver or gold and sold at a reasonable rate.

I may, if I desire, use means for holding the button-hook securely in place on the back of the horn, such for instance as rivets or lugs 14 either inserted in the horn or pressed integrally therefrom. By the use of this retaining means, all danger of the hook slipping off the horn is obviated, even though the secured end of the hook should become slightly loose.

It is also understood that there may be other uses to which the device may be put as for instance, the upturned notched flange 6 may serve as a bottle opener, or a tack or nail remover while if desired other tools or devices than a button hook may be mounted on the horn.

Having thus described my invention, what I claim as new and desire to secure by Letters Patent is:

1. As a new article of manufacture, a shoe horn, a handle pivotally mounted thereon and adapted to be swung back and lie close to the body of the horn when in closed position, and means integral with said horn for holding said handle in closed position.

2. As a new article of manufacture, a shoe horn, a handle pivotally mounted thereon and adapted to be swung back and lie close to the body of the horn when in closed position, and means integral with said horn for holding said handle in open position.

3. As a new article of manufacture, a shoe horn, a handle pivotally and springingly mounted thereon and adapted to be swung back and lie close to the body of the horn when in closed position.

4. A shoe horn comprising an integral sheet of metal, a spring member integral therewith, a handle pivotally mounted on said spring member and means for securing said handle in open or closed position.

5. A shoe horn comprising an integral sheet of metal, a spring member integral therewith, a handle terminating in a hooked end mounted on said spring member and means for securing said handle in open or closed position.

6. As a new article of manufacture, a shoe horn, a handle pivotally mounted thereon and adapted to be swung back and lie close to the body of the horn when in closed position, and means integral with said horn for holding said handle in closed position, said means comprising integral bosses on the convex surface of the horn.

7. As a new article of manufacture, a shoe horn, a handle pivotally mounted thereon and adapted to be swung back and lie close to the body of the horn when in closed position, and means integral with said horn for holding said handle in open position, said means comprising an upturned lip on the upper end of said horn provided with a groove adapted to receive said handle.

8. As a new article of manufacture, a shoe horn formed from an integral piece of metal, a handle adapted to be used as a tool mounted pivotally thereon and secured thereto by a spring adapted to hold it close to the convex surface of said horn when closed and in locked relation when opened.

9. As a new article of manufacture, a shoe horn and hooked handle adapted for use as a button hook pivotally mounted thereon, a locking member integral with said horn, and spring means for holding said handle open and in engagement with said locking means.

10. As a new article of manufacture, a horn, a spring member integral therewith, a handle pivotally mounted on said spring member, locking means, a locking member integral with the end of said horn adapted to engage said handle when open while the spring member holds said handle against closing.

In witness whereof, I have hereunto subscribed my name in the presence of two witnesses.

CONRAD ROSINE.

Witnesses:
F. H. DRURY,
ANNE SOLOMON.